(12) United States Patent
Conard

(10) Patent No.: US 8,416,319 B2
(45) Date of Patent: Apr. 9, 2013

(54) SYSTEMS AND METHODS FOR IMAGING OBJECTS

(75) Inventor: Todd Conard, Hillsborough County, FL (US)

(73) Assignee: Freedom Scientific, Inc., St. Petersburg, FL (US)

(*) Notice: Subject to any disclaimer, the term of this patent is extended or adjusted under 35 U.S.C. 154(b) by 175 days.

(21) Appl. No.: 12/563,814

(22) Filed: Sep. 21, 2009

(65) Prior Publication Data

US 2010/0073515 A1 Mar. 25, 2010

Related U.S. Application Data

(60) Provisional application No. 61/099,185, filed on Sep. 22, 2008.

(51) Int. Cl.
*H04N 5/232* (2006.01)
(52) U.S. Cl.
USPC ............... 348/229.1; 348/208.12; 348/221.1; 348/362; 348/364
(58) Field of Classification Search ............ 348/208.12, 348/221.1, 229.1, 362, 364
See application file for complete search history.

(56) References Cited

U.S. PATENT DOCUMENTS

| | | | | |
|---|---|---|---|---|
| 7,064,775 B2 * | 6/2006 | Takakuwa | ............... | 348/164 |
| 2001/0013903 A1 * | 8/2001 | Suzuki et al. | ............... | 348/362 |
| 2003/0095189 A1 * | 5/2003 | Liu et al. | ............... | 348/208.4 |
| 2003/0174772 A1 | 9/2003 | Voronov et al. | | |
| 2007/0248330 A1 | 10/2007 | Pillman et al. | | |
| 2008/0204565 A1 | 8/2008 | Yumiki | | |

FOREIGN PATENT DOCUMENTS

| | | |
|---|---|---|
| EP | 2051209 | 4/2009 |
| WO | WO2008/039551 | 4/2008 |

OTHER PUBLICATIONS

International Preliminary Report on Patentability, PCT/US2009/057682, issued Mar. 22, 2011.
International Search Report, PCT/US2009/057682, issued Dec. 1, 2009.

* cited by examiner

*Primary Examiner* — Anthony J Daniels
(74) *Attorney, Agent, or Firm* — Foley & Lardner LLP

(57) ABSTRACT

Systems and methods for imaging objects are provided. An imaging device includes a sensor to provide an image of an object. The sensor can have a sensor exposure time and a sensor gain and the image includes a plurality of frames, each of the plurality of frames that can depict at least a portion of the object. The imaging device includes a motion detector to determine whether there is movement of the at least a portion of the object between adjacent frames of the plurality of frames. The imaging device also includes a controller. The controller can set the sensor exposure time to a first value in response to a determination by the motion detector that there is movement of the at least a portion of the object between adjacent frames. The controller can also set the sensor exposure time to a second value in response to a determination that there is no movement of the at least a portion of the object between adjacent frames. The controller can also adjust the sensor exposure time, the sensor gain, or both to maintain a luminance value of the plurality of frames at a target luminance value.

22 Claims, 7 Drawing Sheets

SYSTEMS AND METHODS FOR IMAGING OBJECTS

RELATED APPLICATIONS

This application claims priority under 35 U.S.C. §119 or 365 to U.S. Provisional Patent Application No. 61/099,185, filed Sep. 22, 2008. The entire teaching of that application is incorporated herein by reference.

BACKGROUND OF THE INVENTION

1. Field of Invention

Embodiment of the present invention are directed to imaging systems and methods, and more particularly to imaging systems and methods capable of addressing the needs of persons with at least some degree of visual impairment.

2. Discussion of Related Art

Many people suffer from vision impairments or some degree of vision loss. With an aging population, the number of people with at least some form of age related vision loss or impairment continues to grow. Industrial accidents, hereditary conditions, and diseases such as diabetes result in degrees of vision loss or impairment that can afflict younger populations as well.

Viewing text documents and other images or objects is a constant challenge for people with visual impairments. Even people with a relatively minor degree of visual impairment may have difficulty viewing particular details of images of certain styles, shapes or sizes. Further, small font sizes or minute details of objects may be difficult to perceive even for people with normal vision.

SUMMARY OF THE INVENTION

Low vision magnifying systems are used to view static images, such as photographs or medicine bottles (viewing mode), and to move across and read printed material, such as newspapers or magazines (reading mode). These two modes present conflicting requirements, especially for magnifying systems. The viewing mode requires very low noise, as any noise is appreciably increased during the magnification and contrast enhancement stages and detracts from the clarity of the image. The reading mode requires high speed exposures to prevent the blurring or smearing of the letters and images which makes them illegible while moving the device along the text being read. This means that the viewing and reading modes require different optimizations. In particular, the exposure for viewing static images should be one that minimizes noise, while the exposure for the reading mode must be fast to prevent blurring. Existing products select an exposure that is a compromise between these two modes and not the most optimal for either. Recognizing the differences between the two modes, this invention detects relative motion and dynamically determines which settings are most optimal for the mode that is being used.

At least some embodiments are directed to devices and methods for imaging objects. Images of objects can be produced and parameters of the images can generally be controlled to, for example, magnify, alter, or adjust the images for viewing by a user.

At least one aspect of the present invention is directed to an imaging device. The imaging device may include a sensor to provide an image of an object. The sensor can have a sensor exposure time and a sensor gain and the image includes a plurality of frames, each of the plurality of frames that can depict at least a portion of the object. The imaging device may include a motion detector to determine whether there is movement of the at least a portion of the object between adjacent frames of the plurality of frames. The imaging device may also include a controller that can set the sensor exposure time to a first value in response to a determination by the motion detector that there is movement of the at least a portion of the object between adjacent frames. The controller can also set the sensor exposure time to a second value in response to a determination that there is no movement of the at least a portion of the object between adjacent frames. Further, the controller can adjust the sensor exposure time, the sensor gain, or both to maintain a luminance value of the plurality of frames at a target luminance value.

Another aspect of the present invention is directed to a method of imaging objects. The method includes generating an image of an object using a sensor, the image including a plurality of frames depicting at least a portion of the object. The method can also include determining whether there is movement between of the at least a portion of the object between adjacent frames of the plurality of frames. Responsive to the act of determining, the method may include an act of setting a sensor exposure time of the sensor to a first value when movement of the at least a portion of the object between adjacent frames is determined. When no movement of the at least a portion of the object between adjacent frames is determined, the method may include setting the sensor exposure time of the sensor to a second value that is substantially different than the first value. The method may also include an act of adjusting at least one of the sensor exposure time and a sensor gain of the sensor to substantially maintain a luminance value of the plurality of frames at a target luminance value. This may occur irrespective of whether movement of the at least a portion of the object between adjacent frames is determined or not.

A further aspect of the present invention is directed to a computer readable medium encoded with instructions for execution on a processor. The instructions when executed, performing a method including an act of generating an image of an object using a sensor, the image including a plurality of frames depicting at least a portion of the object. The instructions when executed, can include an act of determining whether there is movement between of the at least a portion of the object between adjacent frames of the plurality of frames. Responsive to the act of determining, the instructions when executed can include an act of setting a sensor exposure time of the sensor to a first value when movement of the at least a portion of the object between adjacent frames is determined. When no movement of the at least a portion of the object between adjacent frames is determined, the instructions when executed can include an act of setting the sensor exposure time of the sensor to a second value that is substantially different than the first value. The instructions when executed can include an act of adjusting at least one of the sensor exposure time and a sensor gain of the sensor to substantially maintain a luminance value of the plurality of frames at a target luminance value irrespective of whether movement of the at least a portion of the object between adjacent frames is determined or not.

A further aspect of the present invention is directed to an imaging device including a sensor configured to produce an image of an object, the sensor having a sensor exposure time and a sensor gain and the image including a plurality of frames. The imaging device may include a motion detector to determine whether there is relative motion between the object and the sensor. The imaging device may also include a controller configured to set the sensor exposure time to a first value in response to a determination by the motion detector that there is relative motion between the object and the sensor, and to set the sensor exposure time to a second value that is substantially different than the first value in response to a determination that there is no relative motion between the object and the sensor. The controller can also adjust at least one of the sensor exposure time and the sensor gain to substantially maintain a luminance value of the plurality of frames of the image at a target luminance value irrespective of whether relative motion between the object and sensor is detected or not.

In various embodiments, during a period of time in which it is determined that there is movement of the at least a portion of the object between adjacent frames, the controller may maintain the sensor exposure time at the first value and may adjust the sensor gain to substantially maintain the luminance value of the plurality of frames at the target luminance value. During a first portion of a period of time in which it is determined that there is no movement of the at least a portion of the object between adjacent frames, the controller may maintain the sensor exposure time at the second value and may adjust the sensor gain to substantially maintain the luminance value of the plurality of frames at the target luminance value. During a second portion of the period of time in which it is determined that there is no movement of the at least a portion of the object between adjacent frames, the controller may maintain the sensor gain at a fixed gain value and to further adjust the sensor exposure time to a fixed exposure time value so that the luminance value of the plurality of frames is equal to the target luminance value. During a third portion of the period of time in which it is determined that there is no movement of the at least a portion of the object between adjacent frames, the controller may maintain the sensor gain at the fixed gain value, and may maintain the sensor exposure time at the fixed exposure time value.

In some embodiments, the imaging device includes a color detector to determine whether the image is a color image or a black and white image. The controller may adjust the sensor exposure time, gain, or both to substantially maintain the luminance value of the plurality of frames at different first and second target luminance values dependent upon whether the image is determined to be a color image or a black and white image. In one embodiment, the color detector can be implemented by the controller.

In various embodiments, the motion detector may determine that there is movement of the at least a portion of the object between adjacent frames in response to relative motion between the object and the sensor and in response to a change in magnification of the at least a portion of the object between adjacent frames.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. The foregoing and other objects, features, and advantages of the systems and methods disclosed herein will be more fully understood from the following description of various embodiments, when read together with the accompanying drawings, in which.

DETAILED DESCRIPTION

Figure 1:
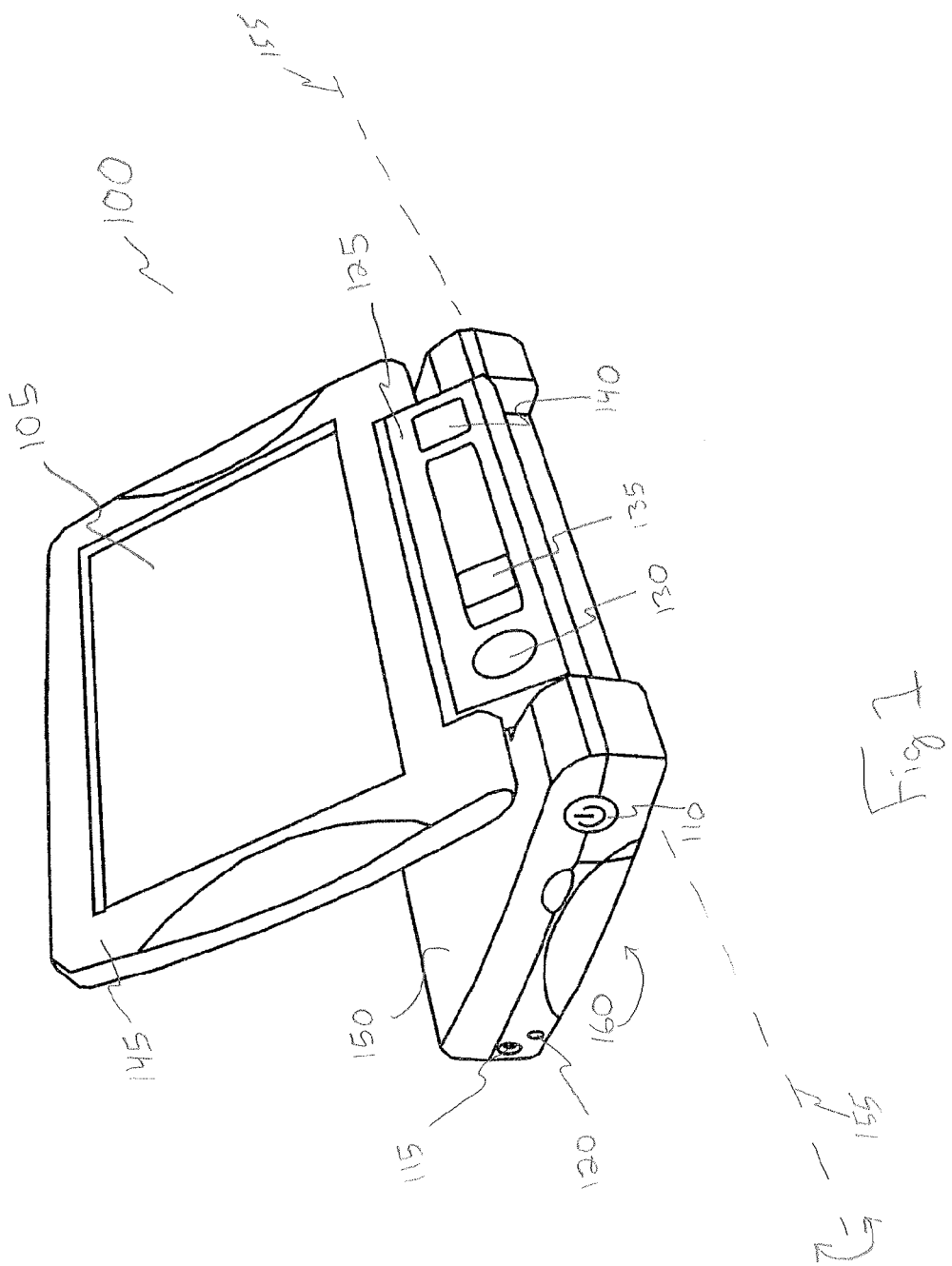
FIG. 1 is a perspective view of an imaging device in accordance with an embodiment of the present invention in a first configuration.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter and equivalents thereof as well as additional items.

Various aspects and embodiments are directed to imaging objects. For example, and as discussed further below, an imaging device may capture or produce images of an object. These images, which may include a series of frames, may be enlarged to facilitate their viewing. When, for example, there is relative motion between an imaging device and an object being imaged by the imaging device, a resulting image may include visually perceptible noise, blurring, or other artifacts. These artifacts may be enlarged together with the image, thus degrading image quality of any resulting display of the enlarged image. In accordance with the present invention, image parameters may be adjusted to control levels of unwanted artifacts that may appear in the enlarged image. Adjusting parameters, such as sensor exposure time or gain, may reduce visually perceptible and unwanted artifacts to an acceptable level, which facilitates perception of an image or enlarged portion thereof by users.

In FIG. 1, there is illustrated a perspective view of an imaging device 100. In various embodiments, imaging device 100 may include imaging devices such as those available from Freedom Scientific BLV Group, LLC. of Saint Petersburg, Fla. In one embodiment, imaging device 100 can be a fixed device designed to remain at a relatively fixed location such as on a desk. In some embodiments, imaging device 100 can be a portable device, such as a handheld device that may draw, for example, battery power. Imaging device 100 may include a device dedicated to imaging objects, or imaging device 100 may be part of a portable or fixed multitask device, such as a personal digital assistant or a desktop computer.

As illustrated in FIG. 1, imaging device 100 may include at least one display 105. Display 105 may include, for example a liquid crystal, plasma, or other flat panel display, as well as monitor or cathode ray tube displays. Although illustrated in FIG. 1 as being an integral component of imaging device 100, in one embodiment display 105 may be remote from imaging device 100. For example, a cable (not shown in FIG. 1) such as an RCA video connector may connect imaging device 100 to a display 105 that includes a television or computer monitor. In one embodiment, where imaging device 100 is a portable device, display 105 may include, for example, a 7 inch liquid crystal display. This example is not limiting, as display 105 may be of various shapes and sizes.

Display 105 may display all or part of in image in a variety of modes. For example, display 105 may display a still image, (for example a single frame of an image) or a video image (for example a series of frames). Images provided to or displayed by display 105 may be displayed in real or substantially real time. In one embodiment, images displayed on display 105 may be retrieved from memory for time-shifted viewing.

In one embodiment, imaging device 100 includes at least one power switch 110, power connector 115, and power indicator 120. As should be appreciated, power switch 110 may include a button for turning imaging device on and off, power connector 115 may include a cord to connect imaging device with an external power source, and power indicator 120 may include a display such as a light emitting diode to indicate to a user that imaging device 100 is operational or turned on. For example, power indicator 120 may include light emitting diodes that indicate battery status. It should also be appreciated that imaging device 100 may draw power from direct or alternating current sources via, for example, an internal or external battery or wall outlet.

In some embodiments, imaging device 100 can include a front panel 125. Front panel 125 may include user interface features such as color selector 130, magnification selector 135, and freeze frame selector 140. Freeze frame selector 140 may include a button that, when activated by a user, pauses a display of at least a portion of an image. In one embodiment, imaging device 100 includes magnification selector 135 that is capable of magnifying at least a portion of an image incrementally, for example between two and sixteen times the size of the object being imaged by imaging device 100. In another embodiment, imaging device 100 includes magnification selector 135 that is capable of magnifying at least a portion of an image continuously, i.e., smoothly and without steps.

In some embodiments, color selector 130 may select from various color schemes a background color or a text color that may form part of an image provided to display 105. For example, color selector 130 may include a button that, when pressed by a user, cycles through various color options for display of an image. Color selector 130 may select from color options that enhance a display of an image by adjusting contrast or other characteristics of certain foreground or background colors including white, black, yellow, red, magenta, or blue, for example.

With reference to the embodiment of FIG. 1, the position of display 105 and its associated frame 145 can be adjustable with respect to housing 150. For example, display 105 and housing 150 may pivot with respect to first axis 155. It should be appreciated that in other embodiments, display 105 may be in a fixed position with respect to housing 150 and thus may not rotate as illustrated, for example, in the embodiment of FIG. 1.

Figure 2:
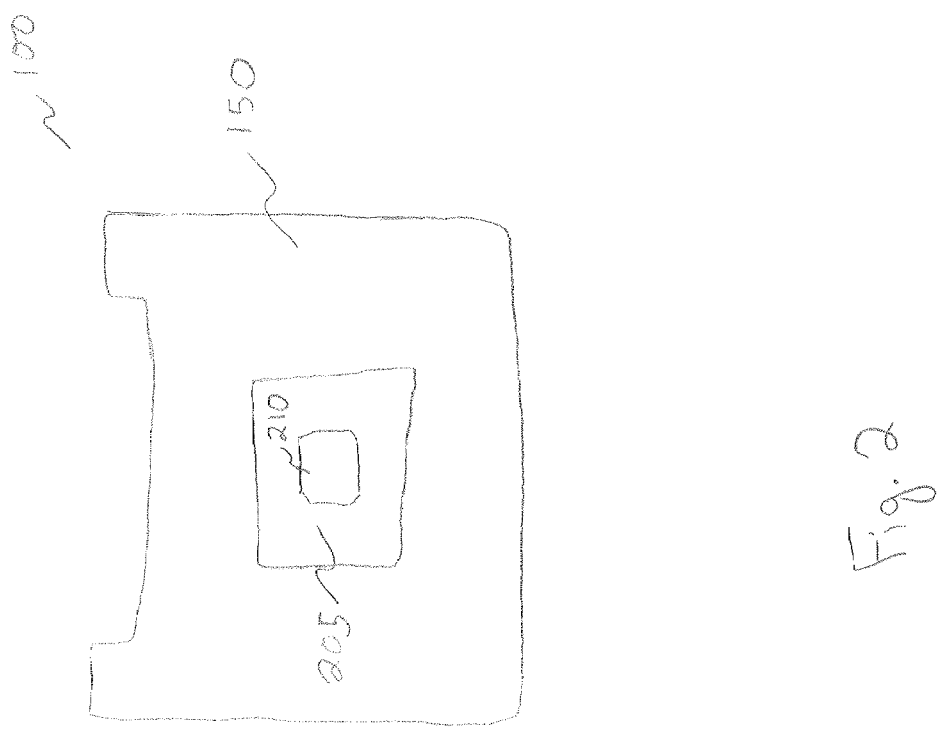
FIG. 2 is a plan view of the underside of an imaging device in accordance with another embodiment of the present invention.

In FIG. 2, there is illustrated a plan view of the underside of the imaging device 100 in accordance with one embodiment of the present invention. In this embodiment, imaging device 100 may include at least one imaging window 205. As illustrated in FIG. 2, imaging window 205 may be disposed within housing 150. In some embodiments, housing 150 also supports at least one sensor 210. For example, imaging window 205 may include a transparent lens and sensor 210 may be located within housing 150, internal to imaging device 100 and covered by imaging window 205. In this example, an object passed in the vicinity of imaging window 205 can be detected by sensor 210. As discussed further herein, sensor 210 may include a CMOS sensor, surveillance camera, or other image capturing device that can generate an image of an object.

With reference to FIGS. 1 and 2, imaging window 205 may be located in panel 160 of housing 150. For example, imaging device 100 may be designed for use as a hand held device. When operational, imaging device 100 may be placed so that panel 160 faces an object (not shown in FIGS. 1 and 2). In this example, imaging window 205 passes over the object, and sensor 210 may produce an image of the object. In some embodiments, relative motion exists between imaging device 100 and the object. This motion may be due to movement of imaging device 100 (or components thereof) relative to a stationary object, movement of the object relative to the stationary imaging device 100, or both movement of imaging device 100 and the object. For example, an object may be in a fixed position and imaging device 100 may pass by the object so that sensor 210 is exposed to the object for a period of time. In one embodiment, imaging device 100 and the object are in fixed positions so that there is no relative movement between them.

It should be appreciated that the location of imaging window 205 and sensor 210 are not limited to any particular part of imaging device 100. For example, imaging window 205 and sensor 210 may be located at various points of housing 150, including panel 160. In one embodiment, imaging window 205 and sensor 210 can be part of a device that is separate from display 105. For example, wired or wireless connections may allow images of objects to be transmitted from sensor 210 to display 105. In various embodiments, imaging window 205 need not be a flat surface. For example, imaging window 205 may protrude or be extendable from imaging device 100.

Figure 3:
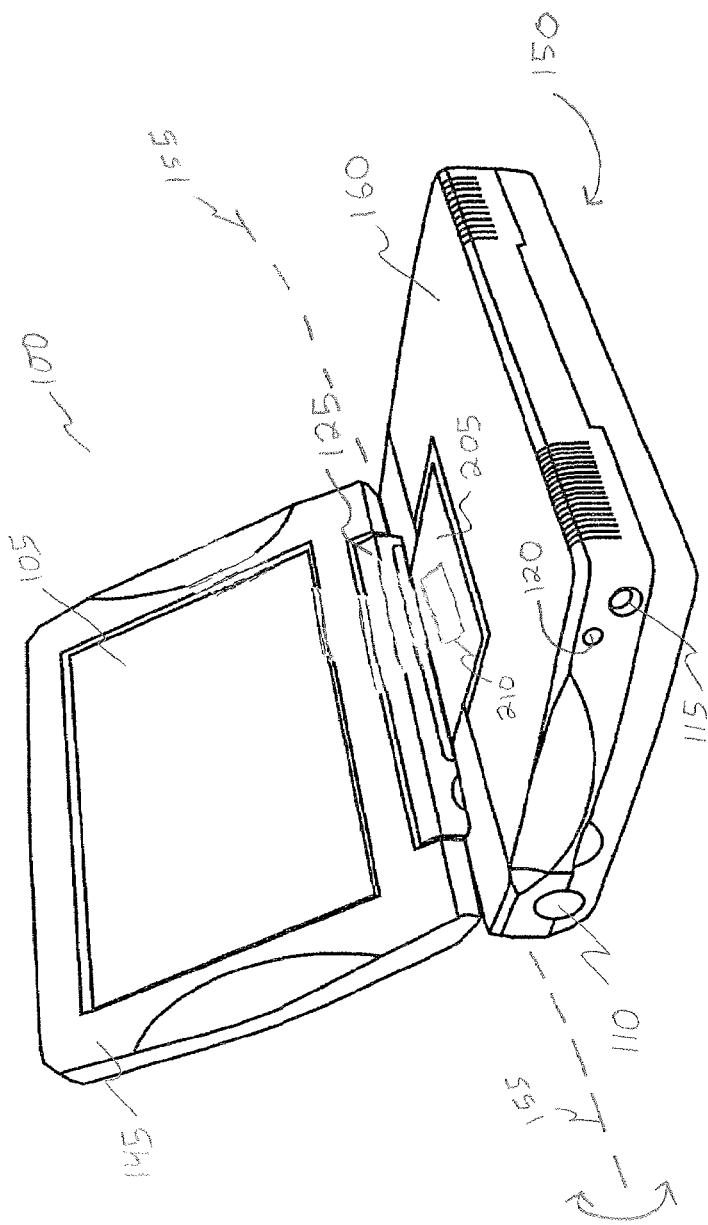
FIG. 3 is a perspective view of an imaging device in accordance with an embodiment of the present invention in a second configuration.

In FIG. 3, there is illustrated a perspective view of imaging device 100 in a third configuration. With respect to FIGS. 1 and 3, it can be seen that display 105 of imaging device 100 as illustrated in FIG. 1 may pivot about first axis 155 into the position illustrated in FIG. 3, with panel 160 and imaging window 205 generally in front of display 105. For example, in FIG. 3, an object such as a pill bottle may be passed over imaging window 205. In this example, sensor 210 may capture or produce an image of the pill bottle, or a portion thereof such as a label affixed to the pill bottle.

Figure 4:
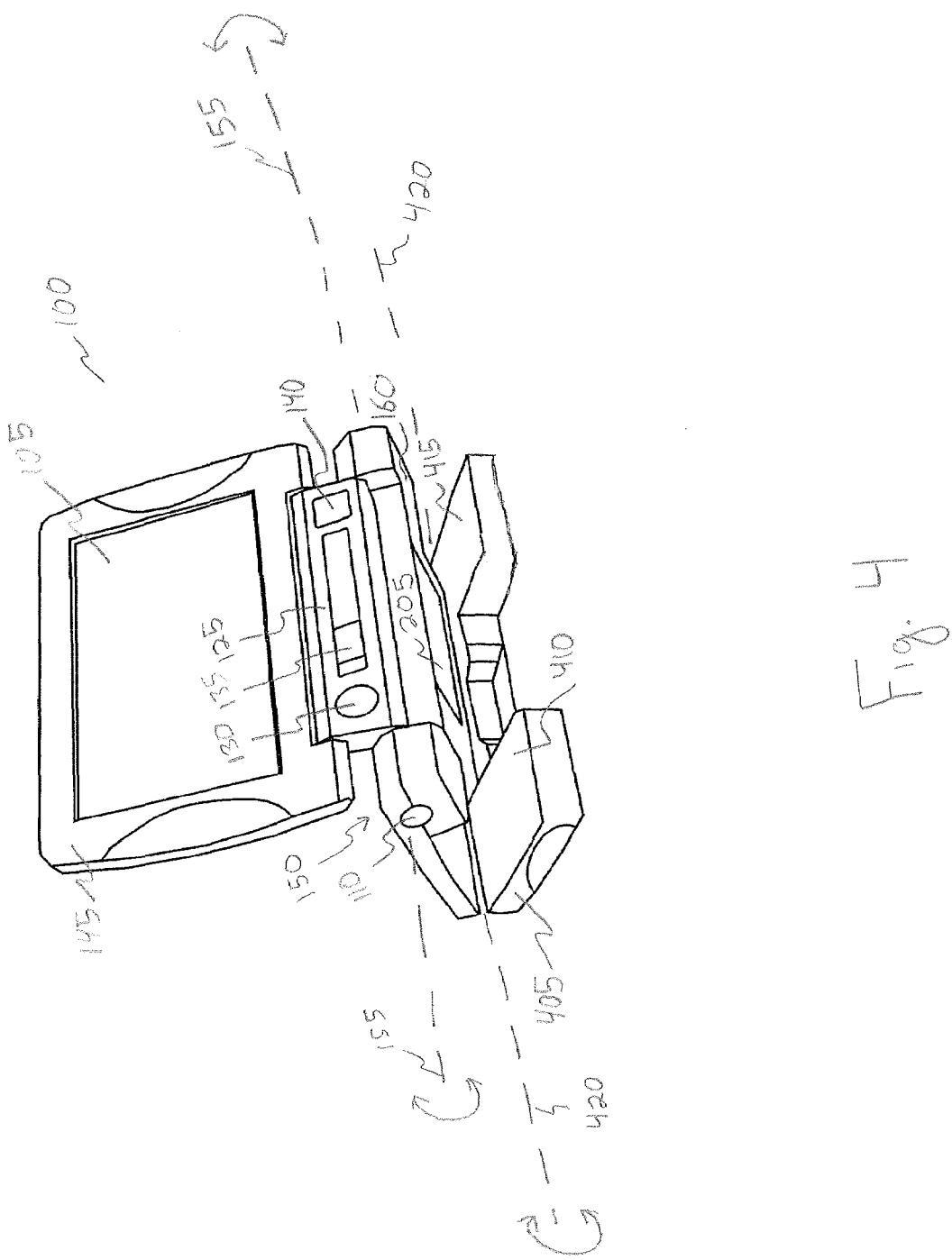
FIG. 4 is a perspective view of an imaging device in accordance with an embodiment of the present invention in a third configuration.

In FIG. 4, there is illustrated a perspective view of imaging device 100 in yet a further configuration. In the embodiment illustrated in FIG. 4, imaging device 100 includes a stand 405. In various embodiments, stand 405 may pivot about second axis 420 relative to housing 150. For example, stand 405 may pivot with respect to housing 150 to position imaging window 205 so that an object may be placed near or pass by imaging window 205. Stand 405 may also pivot to position display 105 in a location suitable for image viewing by a user.

In an alternate embodiment, stand 405 includes first leg 410 and second leg 415. As illustrated in FIG. 4, imaging window 205 may be positioned so that sensor 210 (not shown in FIG. 4) may capture images of objects placed or passing generally between first leg 410 and second leg 415.

It should be appreciated that imaging device 100 may have other configurations than those illustrated in the examples of FIGS. 1-4. For example, imaging device 100 may include multiple sensors 210. In this alternative embodiment, sensors 210 capture images of an object from multiple angles, at the same time, or at different times. In a further embodiment, imaging device 100 includes a sufficient amount of memory to store images of objects, such as still or video images. These stored images may be used, for example, to time shift display of images or magnified portions thereof on display 105.

Figure 5:
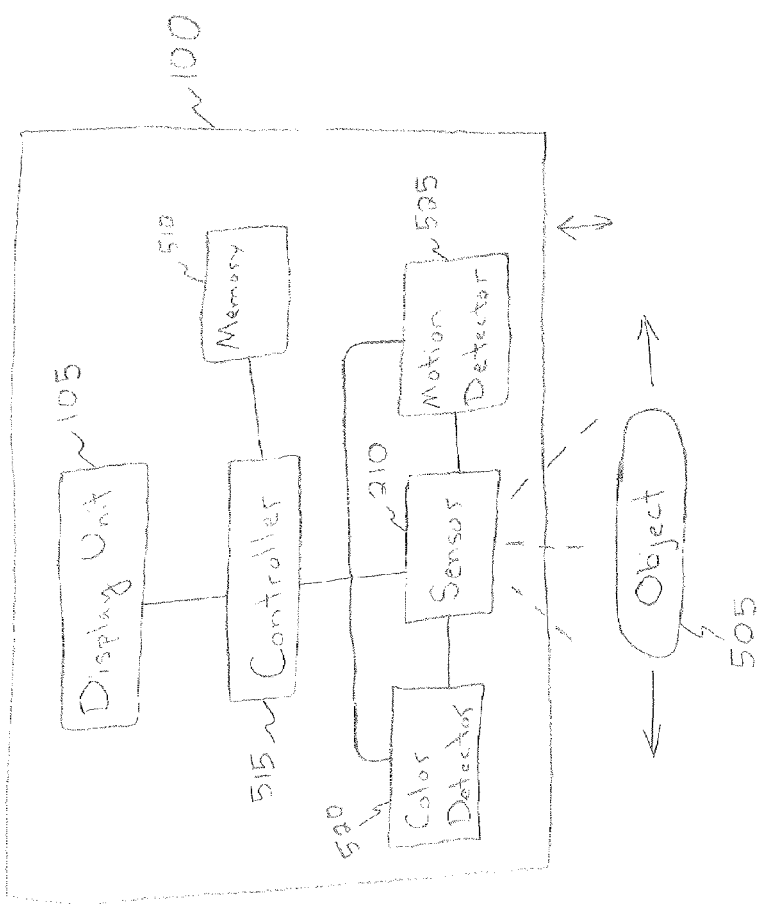
FIG. 5 is a functional block diagram depicting an imaging device in accordance with an embodiment of the present invention.

In FIG. 5, there is illustrated a functional block diagram depicting imaging device 100 in accordance with an embodiment of the present invention. In the various embodiments described herein, imaging device 100 can capture an image of at least one object 505 for display by display unit 105. Object 505 can encompass a wide variety of objects with various shapes and forms. For example, object 505 may include documents with text, designs, or patterns. In some embodiments, object 505 includes documents having fine print or fonts difficult to visually perceive. Object 505 may include legal or medical documents, such as contracts or prescriptions for medicine. In one embodiment, object 505 may include a label affixed to a medicine bottle. In another embodiment, object 505 may include pieces of art. Object 505 may include elements to be studied, such as tissue samples or living creatures. Examples of objects include documents, graphics, labels, or pictures, and the objects may be flat, uneven, concave, convex, or three dimensional in nature. It should be appreciated that object 505 can have a variety of shapes and sizes, and may be larger or smaller than imaging device 100.

In various embodiments, sensor 210 captures or creates images of object 505. For example, sensor 210 may produce a series of images of object 505 during a time period in which object 505 is within an operational range of sensor 210. In some embodiments, images of object 505 produced by sensors 210 may be provided to display unit 105 in real time or near real time. In another embodiment, images may be buffered or stored in memory 510 for time shifted display by display unit 510. The images may include a series of frames.

In various embodiments, sensor 210 includes an image sensor with configurable gain and exposure time values. For example, sensor 210 may include an active pixel sensor having an integrated circuit and an array of pixel sensors or other photodectors. In one embodiment, sensor 210 includes at least one CMOS sensor in the form of a chip. For example, sensor 210 may include a multi-megapixel CMOS sensor chip with a full resolution frame rate of, for example, 15 frames per second. In one embodiment, sensor 210 includes a chip with a footprint of 8 by 8 mm or less.

In some embodiments, sensor 210 images an object and outputs frames to display unit 105 directly or via controller 515. For example, sensor 210 may output frames in a raw format or compressed red, green, and blue (RGB) pixel data. Pixel data produced by sensor 210 may include luminance, chrominance, hue, or saturation data of pixels corresponding to at least a portion of an image of object 505. In one embodiment, sensor 210 may output compressed pixel data.

In various embodiments, color detector 520, which may be part of sensor 210, can evaluate luminance and chrominance pixel data to identify images as being color or black and white images. For example, object 505 may include a white piece of paper with black lettering thereon. In this example, color detector 520 may sample RGB luminance and chrominance pixel data and determine that the data is within a threshold level of uniformity, e.g., a difference between red, green, and blue pixel data is less than a threshold differential. Continuing with this example, color detector 520 may identify the image as a black and white image due to a lack of contrast between RGB pixel data values. In one embodiment, color detector 520 identifies an image captured by sensor 210 as being a color image when a difference in RGB pixel value data is greater than a threshold difference value. For example, when an image produced by sensor 210 includes color, the red, green, and blue pixel values can differ from each other to a degree sufficient to generate a particular color in the image. In this example, color detector 520 may identify color in at least a portion of the image when this difference, or delta, is greater than a threshold value.

In one embodiment, color detector 520 may determine an amount of color in an image, and controller 515 may adjust or select a target luminance value based in part on an amount of color detector 520 indicates is present in at least a portion of a frame of an image. For example, on a luminance scale ranging from 0 to 255, a target luminance value of 66 may be set responsive to color detector 520 indicating that the image is a black and white image, and a target luminance value of 92 may be set responsive to color detector 520 indicating that the image is a color image. It should be appreciated that these are examples, and that different target luminance values may be selected.

In various embodiments, imaging device 100 includes at least one motion detector 525. In one embodiment, motion detector 525 detects relative motion between imaging device 100 and object 505. For example, imaging device 100 may be in a fixed position while object 505 moves, for example, proximate to sensor 210. In one example, object 505 may be stationary as imaging device 100 passes by object 505. In another example, both object 505 and imaging device 100 may be in motion. For example, motion detector 525 may include an accelerometer to determine that object 505 is in motion with respect to imaging device 100. The motion detector 525 may in other embodiments be any device or system (including methods implemented in software) capable of determining whether there is relative motion between the imaging device 100 and the object 505.

In some embodiments, motion detector 525 detects motion between imaging device 100 and object 505 based at least in part on object motion detected between frames of the image produced by sensor 210. For example, images produced by sensor 210 may include a plurality of frames, each frame including a series of rows of pixels. A frame of the image may be displayed by display unit 105 as a picture (e.g., snapshot) of the image. A series of frames viewed in succession may be displayed by display unit 105 as a video.

In various embodiments, motion detector 525 can determine whether there is movement of at least a portion of the object as represented in any two or more of the plurality of frames. For example, adjacent frames may have different magnification values, causing the location of at least a portion of an object to vary between two frames. Motion detector 525 may detect motion due to magnification of the image of the object, regardless of physical movement between imaging device 100 and object 505.

In one embodiment, motion detector 525 can evaluate frames of the image to deduce the existence of relative motion between object 505 and imaging device 100. For example, a first frame of the image and a second frame of the image may differ when there is relative motion between imaging device 100 and object 505. First and second frames may, but need not, be subsequent frames of an image. Motion detector 525 may identify pixels of the first frame and second frame that are associated with edges of portions of the image. When, for example, an edge has different respective locations in the first and second frames, motion detector 525 may determine that relative motion exists between imaging device 100 (or sensor 210) and object 505.

In various embodiments, motion detector 525 can determine motion between imaging device 100 or its components and object 505 based at least in part on luminance values of at least one frame of the image. For example, motion detector 525 may determine a luminance value of a first frame and a luminance value of a second frame. In this example, motion detector 525 alone or in combination with controller 515 or sensor 210, may determine a delta value that is the difference in luminance values between the luminance value of the first frame and the luminance value of the second frame. When the delta value (or an aggregated series of delta values) is, for example, greater than a threshold value, motion detector 525 may determine or identify relative motion between object 505 and imaging device 100.

In some embodiments, motion detector 525 can identify relative motion between object 505 and imaging devices 100 by evaluating luminance data from portions of frames of an image produced by sensor 210. For example, an image may include a series of frames, and the frames may be divided into sections such as quadrants. Motion detector 525 may identify a luminance value of at least one of the quadrants of a first frame and at least one of the quadrants of the second frame as well as a delta value of the difference between luminance values of the first frame quadrant and the second frame quadrant. In this example, motion detector 525 may detect relative motion between objects as depicted in the frames based on a comparison of the delta value with a threshold value. For example, relative motion may exist when the delta value is greater than the threshold value. In one embodiment, motion detector 525 can determine that no relative motion exists when the delta value is less than the threshold value.

In various embodiments, motion detector 525 identifies luminance values from corresponding quadrants of successive frames. Frames may be divided in various manners, and need not be divided into quadrants or other segments of equal size. In some embodiments, motion detector 525 can evaluate corresponding portions of any two frames of an image and, based on luminance values, detect relative motion between imaging device 100 and sensor 210. Further, luminance values may be sampled by motion detector 525 or received from any of sensor 210, color detector 520, controller 515, or memory 510.

It should be appreciated that controller 515 will generally include at least one processor, microchip or integrated circuit. Controller 515 may also include or implement all of portions of the sensor 210, the color detector 520, and the motion detector 525. In one embodiment, controller 515 controls sensor 210 parameters. For example, controller 515 may adjust sensor gain or sensor exposure time of sensor 210. In another embodiment, sensor gain and sensor exposure time can be adjusted simultaneously. These adjustments improve image quality by reducing, for example, noise and blur characteristics due to relative movement between imaging device 100 and object 505 during sensor 210 operation.

In one embodiment, controller 515 includes a field programmable gate array that can detect luminance values of frames of an image. For example, the field programmable gate array may identify and aggregate a plurality of pixel luminance values of pixels of a frame. In another example, the field programmable gate array may identify a plurality of pixel luminance difference values between pixels of the first frame and pixels of the second frame, and aggregate the plurality of pixel luminance difference values to determine an aggregate or average pixel luminance difference value.

In various embodiments, a user with a portable imaging device 100 may move imaging device 100 past object 505 so that sensor 210 passes object 505. For example, a user may move imaging device 100 past an open medicine cabinet. Object 505 may include at least one label affixed to a pill bottle on a shelf of the medicine cabinet. In this illustrative embodiment, relative motion exists between imaging device 100 and object 505 due to the user moving imaging device 100 past the medicine cabinet. Continuing with this example, motion detector 525 identifies relative motion between imaging device 100 and object 505. This relative motion may cause an image captured by sensor 210 to appear blurred or noisy when displayed by display unit 105 in real time (or in near real time). Responsive to the detected relative motion, controller 515 can adjust at least one of sensor gain and exposure time to enhance the viewability of the image.

In an illustrative embodiment, sensor 210, with a configurable gain and exposure time, may provide a plurality of frames, and each frame may depict at least a portion of the object. Motion detector 525 may detect motion of all or part of object 505 between frames of the image based on, for example, physical motion between imaging device 100 and object 505, motion based on detection of edges of the object as represented in the frames, motion based on changes in total, partial, or average frame luminance values, or motion based on magnification of the object as represented in the frames of the image.

Continuing with this illustrative embodiment, responsive to motion detector 525 determining that there is movement of the object between frames, controller 515 can set sensor exposure time to a first value. When, for example, sensor exposure time is at the first value, controller 515 may adjust sensor gain to maintain a luminance value at a constant luminance value. In one embodiment, the first value of the sensor exposure time may be less than a previous sensor exposure time. In this embodiment, controller 515 may increase sensor gain to maintain a constant luminance output. For example, sensor 210 may have a frame rate of 15 frames per second. In this example, when motion detector 525 determining that there is movement of the object between frames, controller 515 may set the sensor exposure time to a first value of $\frac{1}{6}^{th}$ the frame rate.

Continuing with this illustrative embodiment, responsive to motion detector 525 determining that there is no movement of the object between frames, controller 515 can set sensor exposure time to a second value. In one example of this embodiment, sensor exposure time may be set to the first value during motion. When motion ceases, controller 515 may change sensor exposure time from the first value to the second value. Changing the sensor exposure time from the first value to the second value can decrease the amount and magnitude of visually perceptible and unwanted image washout, darkness, blur or noise artifacts that could otherwise appear in the displayed image. Controller 515 may then adjust sensor gain responsive to the change in sensor exposure values from the first value to the second value to maintain a relatively constant luminance value. For example, if sensor 210 has a frame rate of, for example, 15 frames per second, when motion detector 525 determines that there is no movement, controller 515 may change the sensor exposure time from a first value of $\frac{1}{6}^{th}$ the frame rate to a second value of $\frac{1}{2}$ the frame rate.

Remaining with this illustrative embodiment, when detector 525 determines that there is no motion, and when controller 515 sets the sensor exposure value to the second value, controller 515 may continue to refine frame luminance values to enhance image display by display unit 105. For example, during a first portion of a time period in which sensor 210 is configured with the second value, controller 515 can maintain sensor exposure time at the second value and adjust sensor gain to control frame luminance. In this example, sensor gain adjustments in combination with the fixed sensor exposure time cause sensor 210 to produce frames with a luminance value close to a target luminance value for optimal image display.

In one example of this illustrative embodiment, changes to sensor gain while sensor time is fixed at the second value may be maintain frame luminance values close to, but different from, the target luminance value. In this example, further sensor gain adjustments combined with the fixed sensor exposure time (at the second value) may produce frames with luminance values that are still not equal to the target value. Continuing with this example, controller 515 may fix sensor gain and adjust sensor exposure time from the second value to drive the frame luminance value to the target luminance value. When, in this example, the frame luminance value and the frame target value match, controller 515 may fix sensor gain and sensor exposure time values at the values that generate the matching frame luminance value. In another embodiment, sensor gain and exposure times may be adjusted simultaneously to match frame luminance values with the target luminance value. In yet another embodiment, where no combination of sensor gain and exposure time values produce a frame luminance value matching a target luminance value, controller 515 may adjust the target luminance value to match a luminance value of at least a portion of one of the frames of the image.

The constant luminance value may be, for example, a predetermined or desired luminance value for image frames of color images or black and white images, or a luminance value for a period of continuous motion between imaging device 100 and object 505. An image having a luminance value substantially similar to the constant luminance value may suitable for display by display unit 105. By setting sensor exposure time at a first value when there is motion, and a second value when there is no motion, and by adjusting sensor gain or sensor exposure time, luminance values of frames produced by sensor 210 can be maintained at or close to a constant luminance value better suited for display by display unit 105. In one embodiment, during a period of continuous motion, exposure time of sensor 210 can be fixed while gain of sensor 210 can be adjusted to maintain the luminance value at or near a constant luminance value, or to drive the luminance value toward the constant luminance value. It should be appreciated that adjusting gain or exposure time, or both, of sensor 210 can change the luminance values of the frames of the image captured by the sensor 210. For example, for a given exposure time, increasing the gain of the sensor 210 will typically increase the luminance value of frames of the image captured by sensor 210, and decreasing the gain of the sensor 210 will reduce the luminance values. Similarly, for a given gain value, increasing the exposure time of the sensor 210 will increase the luminance value of frames of the image captured by sensor 210, and decreasing the exposure time of the sensor 210 will reduce them. Adjustments to sensor gain and exposure may thus maintain frame luminance values at a generally constant level.

In one embodiment, controller 515 can set the sensor exposure time to a second value, and can adjust sensor gain or further adjust sensor exposure time (from the second value) to maintain a luminance value at or near a relatively constant target luminance value. For example, responsive to a state change from motion to no motion between object 505 represented in frames of an image produced by imaging device 100 and object 505, controller 515 may set sensor exposure time to a new (i.e., second) value that may be substantially different from a first value. Controller 515 may then adjust sensor 210 parameters, such as gain or exposure time, or both, to maintain a relatively constant luminance value. In other words, the luminance value remains relatively constant before and after the state change.

With reference to the above illustrated embodiment, where imaging device 100 images the contents of a medicine cabinet, a user may for example hold imaging device 100 steady so that sensor 210 images a portion of a label on a medicine bottle. In another example, after moving imaging device 100, the user may place it next to object 505 on a counter so that they are not, in this example, moving relative to each other. In another example, magnification of an image may stop, so that there is no motion of object 505 between adjacent frames. These examples illustrate a state change from a first period of motion between frames to a period of no motion between frames. Responsive to the state change, sensor exposure time can change from a first value to a second value.

When motion detector 525 indicates that there is no or minimal (e.g., less than a threshold value) relative motion between objects 505 and imaging devices 100 or between frames of an image, controller 515 may adjust at least one of sensor exposure time and gain to drive a luminance value toward a value that is closer or equal to a target constant luminance value. In this example, frames generated after the adjustments to sensor 210 parameters can have luminance values close or equal to the target luminance value. In one embodiment, controller 515 can adjust the gain of sensor 210. In this embodiment, the first frame of the image produced by sensor 210 after the gain has been adjusted may have a luminance value closer to the target luminance value than the last frame produced prior to the gain adjustment.

In various embodiments with no relative motion, controller 515 can adjust the exposure time of sensor 210. In this embodiment, a frame with a luminance value based on the second exposure time value can be produced beginning with the second frame produced by sensor 210 after the exposure time adjustment from the first to the second value has been made. This frame delay may be due to, for example, computational and processing time.

In various embodiments, a user may be scanning one or more objects 505 with imaging device 100. For example, a user in a supermarket aisle may scan imaging device 100 across a row of cereal boxes. In this example, sensor 210 may create an image having a series of frames. The image may be magnified by controller 515 and provided to display unit 515, where the magnified image may be displayed for viewing by a user. It should be appreciated that low vision users may be unable to view markings on the cereal boxes, for example to identify brand or determine cereal ingredients, but those same users may be able to adequately view an enlarged image of portions of the cereal boxes on display unit 105.

Continuing with this example, imaging device 100 may be in motion relative to one or more stationary objects 505 (e.g., cereal boxes). Alternatively, motion may be due to magnification of the image so that two frames of the image have different magnification values, and this a portion of an object appears in different respective locations for different frames. Motion detector 525 may detect this motion and indicate the existence of motion to controller 105. Thus, during a period of motion, controller 515 may determine a first exposure time value to maintain a suitable luminance value for a display of this image, such as a real time video display. For example, the first sensor exposure time value may be provided to or determined by controller 515. In this illustrative embodiment, during the period of relative motion, controller 515 may adjust sensor gain to maintain a luminance value at a visually acceptable level with sensor exposure time set at the first target value. In this example, display unit 105 may display a video sequence of frames that form part of the image in real or substantially real time. The luminance value of the displayed video image may be maintained at or near a target luminance value based at least in part on adjustments to sensor gain, exposure time, or both.

A user may view display unit 105 and see magnified images of objects 505 in real time during a period of motion. In one embodiment, during this period of motion, controller 515 may maintain sensor exposure time at a fixed exposure time, and may periodically or continuously adjust sensor gain to maintain a constant luminance value of the image, or at least one frame thereof. By, for example, adjusting sensor 210 parameters to generate frames with luminance values at or near a predetermined value, artifacts such as exposure, noise, and blur of the displayed image can be reduced.

In one embodiment, relative motion may cease after a period of time. For example, a user may view an image of a particular brand of cereal that he or she wishes to purchase. At this point in time, the first exposure time used in part to control image luminance during motion may be inadequate due for example to a change in the portion of object 505 that is being imaged by sensor 210 when motion ceases. In this example, a sensor exposure time to maintain a quality image display may jump from a first value to a second value.

In some embodiments, responsive to a determination of no motion between object 505 as represented in frames produced by sensor 210 of imaging device 100, controller 515 can set a second sensor exposure time and adjust at least one of sensor gain and exposure time to maintain a constant image luminance. For example, gain may be adjusted with sensor exposure time fixed at a second target value. In one embodiment, controller 515 may determine that no motion exists during a period of time subsequent to a period of time when controller 515 determined that motion did exist.

Responsive to a state change from motion to no motion of at least a portion of the object between frames, controller 515 may determine that the first target sensor exposure time is to be replaced with a second target sensor exposure time. In one embodiment, during the first portion of a time period where controller 515 determines that there is no relative motion between object 505 and sensor 210, controller 515 may adjust sensor gain while maintaining sensor exposure time at the second sensor exposure time to, for example, maintain a constant luminance value at a level suitable for display. For example, gain may increase or decrease while exposure time remains constant. In some embodiments, further luminance refinement may occur by subsequently maintaining a fixed gain and adjusting the sensor exposure time so that it deviates from the second target sensor exposure time. These changes to sensor gain coupled with a steady sensor exposure time when there is no motion between image device 100 and object 505 can drive the luminance value of the image to a range suitable for image viewing by a user.

In various embodiments, during a period of no relative motion, adjustments to sensor gain concurrent with a steady sensor exposure time maintain image luminance near a constant value. In one example of this embodiment, a difference in luminance between the frames and the constant luminance value may remain as long as exposure time remains fixed. In other words, adjustments to sensor gain alone may maintain image luminance value close to, but slightly different from, a constant target luminance value. At this point, in this example, further sensor gain adjustments may not be sufficient to drive frame luminance values any closer to the target luminance value while the sensor exposure time remains fixed. In other words, the coarse control of image luminance value obtained by adjusting sensor gain with a fixed sensor exposure time may approach a limit at the end of a first portion of a period where controller 515 determines that there is no relative motion between object 505 and imaging device 100.

Continuing with this example, in one embodiment, during a second portion of the period of time in which controller 515 determines that there is no relative motion, controller 515 can maintain sensor gain at a fixed value and adjust only sensor exposure time so that it deviates from the second value to which it was previously set. The second portion of a period of no relative motion may follow the first portion of the period of no relative motion. In this example, controller 515 may maintain the sensor gain at the value it had at the end of the first period, and may proceed to increase or decrease sensor exposure time from the second sensor exposure time value during a period of fixed sensor gain. In one embodiment, controller 515 adjusts sensor exposure time with a fixed sensor gain to drive an image luminance value toward the constant target luminance value. This may result in a fine tuning of frame luminance so that it equals the constant luminance value.

Continuing with this illustrative embodiment, controller 515 may determine that the frame luminance value is equal or sufficiently close to the constant luminance value. In this example, an image displayed by display unit 105 may have a luminance value that is substantially similar to the constant luminance value. In one embodiment, during a period of no relative motion, controller 515 may direct sensor 210 to maintain sensor gain and sensor exposure time at their current levels, thus maintaining a steady state image luminance during a third portion of a period of no relative motion.

Thus, in one embodiment, during a period of motion, controller 515 can maintain sensor exposure time at a first value and adjust sensor gain to drive frame luminance toward a constant luminance value. This may enable a visually acceptable display of the image by display unit 105 in real time during relative motion between imaging device 100 and object 505. When motion ceases, controller 515 may maintain sensor exposure time at a second value suited for motionless display of an image. At the second target sensor exposure time value, controller 515 may adjust sensor gain to maintain frame luminance close to the constant luminance value. If, for example, after adjusting gain at the second target exposure time, frame luminance remains unequal to the constant luminance value, controller 515 may fix sensor gain and vary sensor exposure time from the second target value to drive frame luminance to equal the constant luminance value. When frame luminance equals the constant luminance value, controller 515 may fix both sensor gain and sensor exposure time. In one embodiment, where frame luminance remains different from the constant luminance value, the constant luminance value may be redefined as the currently measured frame luminance value with a fixed sensor gain and exposure time.

Continuing with this illustrative embodiment, during a first portion of a period of no relative motion, controller 515 can maintain sensor exposure time at a first value and adjust sensor gain to maintain frame luminance at or near a constant luminance value. During a second portion of the period of time of no relative motion, controller 515 can maintain sensor exposure time at a second value and adjust sensor gain to further drive frame luminance value toward the constant luminance value. When, for example, the frame luminance value and the constant luminance value are substantially equal, (for example within +/−5% of each other), controller 515 can maintain both sensor gain and sensor exposure time at fixed values. For example, controller 515 may increase, decrease, or maintain either or both of sensor gain and sensor exposure time, as well as other sensor 210 parameters, during period of relative motion or no relative motion, to maintain frame luminance at or near a constant luminance value that removes noise, blur, overexposure, or other artifacts from a display of the image. This may occur in real time or may be time shifted with sensor data such as pixel data of a plurality of frames being stored for future retrieval and display in memory 510 or other storage apparatus.

It should be appreciated that controller 515 may select or determine any number of sensor exposure times, and examples herein of first and second target sensor exposure times are nonlimiting. For example, multiple target sensor exposure times may be selected during periods of relative motion between imaging device 100 and object 505, or during periods of image magnification resulting in object motion between frames. In various embodiments, multiple sensor exposure times may be selected during periods of no relative motion. Controller 515 may adjust parameters of sensor 210 based for example on a rate of relative motion between imaging device 100 and object 505 to maintain frame luminance values at a constant luminance value. The luminance value maintained at or near a constant luminance value may include average luminance values of more than one frame, luminance values of a frame, or luminance values of portions of a frame, for example. In one embodiment, the constant luminance value may be responsive to user input.

In various embodiments, controller 515 may adjust sensor 210 parameters to maintain frame luminance at different luminance values based on the image being a color image or a black and white image, as identified for example by color detector 520. A luminance value for a color image may vary based on an amount of color in the image. In one embodiment, in addition to luminance, controller 515 may adjust at least one of contrast, saturation, hue, and chrominance of an image. In various embodiments, this can occur post processing, for example by controller 515, or during image capture, for example by controller 515 adjusting sensor 210 parameters. In various embodiments, controller 515 may increase or decrease a target luminance value dependent on whether an image is identified as a black and white image or a color image.

In various embodiments controller 515 may magnify at least a portion of an image provided by sensor 210, and a magnified image may be stored in memory 510. In one embodiment, controller 515 may magnify an image to between two and sixteen times the size of object 505. In another embodiment, magnification is between three and fifteen times the size of object 505. In one embodiment, a user may incrementally adjust a magnification range on a continuous scale by sliding magnification selector 135 along front panel 125 (see FIG. 1). Display unit 105 may then display at least a portion of the magnified image. For example, a user may scan object 505 with imaging device 100 in order to view a magnified image of object 505 in real time, near real time, or at a later time.

Variances in, for example, motion velocity, lighting, object 505 characteristics, or a distance between object 505 and sensor 210 may occur during start up, periods of continuous relative motion, and periods of no relative motion that follow periods of relative motion. These variances may all affect the quality of the image on the display. For example, relative motion can cause an image to blur. In this example, decreasing sensor exposure time reduces blur. Decreasing sensor exposure time may also reduce the amount of light available to sensor 210 during image capture, reducing frame luminance values. Thus, in one embodiment, sensor gain 210 may be increased. This may increase frame luminance values and offset any luminance decrease due to decreased sensor exposure time, thus maintaining a substantially constant luminance value. In various embodiments, gain and exposure time adjustments may be made concurrently or sequentially. Although in one embodiment, sensor exposure time decreases and gain increases, other combinations are possible. For example, both gain and exposure time may increase or decrease. Further, one may increase while the other decreases, both may increase, or both may decrease, or one or both values may remain fixed.

It should be appreciated that memory 510, controller 515, color detector 520, motion detector 525, sensor 210, and other elements as illustrated in FIGS. 1 to 5 may have various configurations, and may form part of one or more components or logic devices. Further, the elements of these Figures may be interconnected in various ways by, for example, bus lines. One example configuration is illustrated in FIG. 5. Other configurations are possible. For example, controller 515, color detector 520, and motion detector 525 may form part of the same device.

Figure 6:
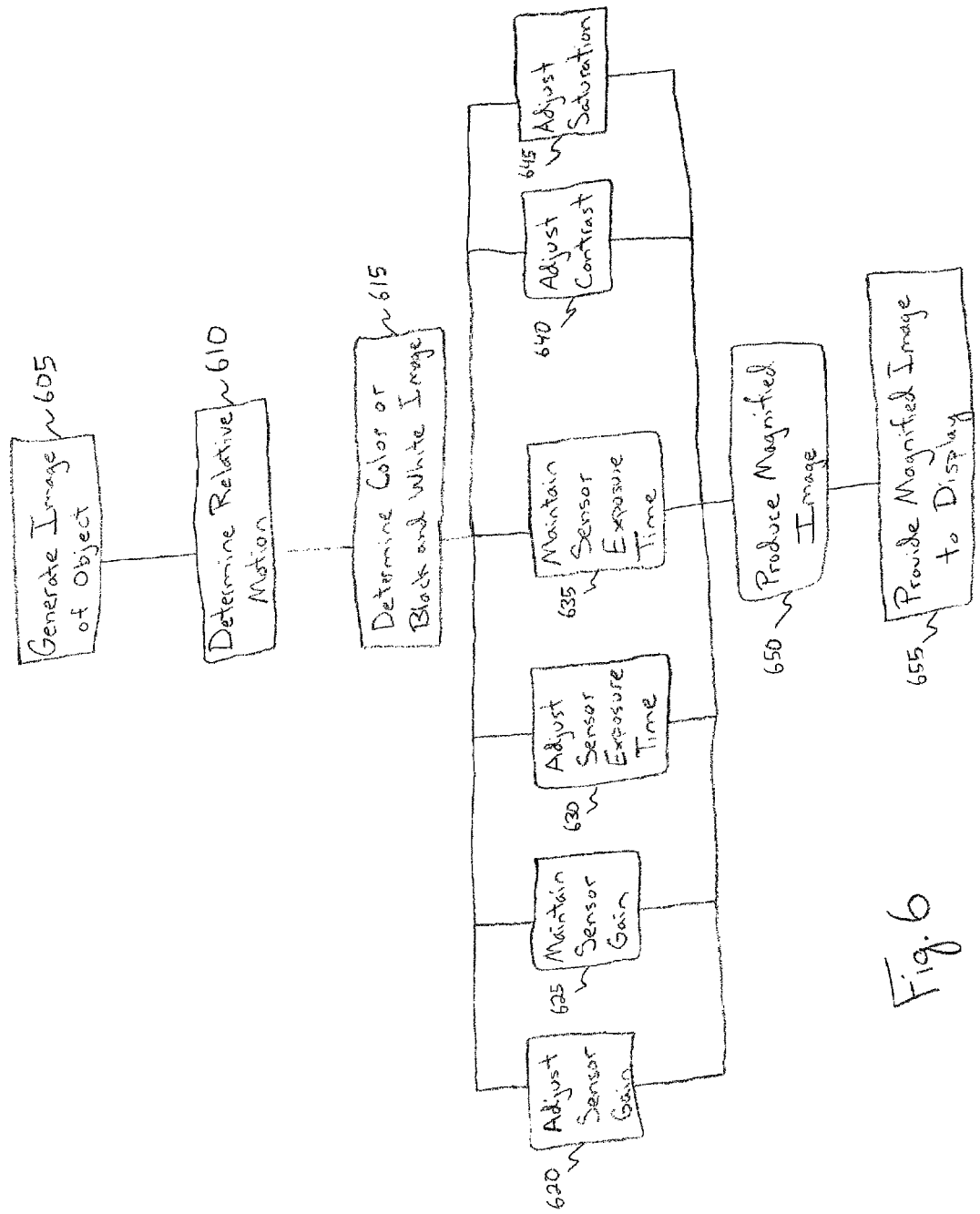
FIG. 6 is a flow chart depicting a method of imaging objects in accordance with an embodiment of the present invention.

In FIG. 6 there is illustrated a flow chart depicting a method 600 of imaging objects. In one embodiment, method 600 includes an act of generating an image of an object (ACT 605). In one embodiment, generating an image of an object (ACT 605) includes generating an image of an object using a sensor, there the image includes a plurality of frames depicting at least a portion of the object. Generating an image of an object (ACT 605) may include a sensor producing a series of frames of an object. For example, an object may pass within range of a sensor, such as an imaging device or scanner. Generating an image (ACT 605) may include generating RGB pixel data of at least one frame of an image corresponding to an object. The sensor and the object may or may not be in relative motion. In one embodiment, generating an image of an object (ACT 605) includes generating images of objects that may be color, black and white, or nonuniformly shaped, for example.

In various embodiments, method 600 includes an act of determining whether relative motion between an object and an imaging device exists (ACT 610). In one embodiment, determining relative motion (ACT 610) includes determining relative motion between an object being imaged and a sensor of an imaging device. For example, determining relative motion (ACT 610) may include determining that the imaging device is at a fixed location while the object is in motion. In another example, determining relative motion (ACT 610) may include determining that the object is at a fixed location, such as on a store shelf, and the imaging device including the sensor is moving past the object. In yet another example, determining relative motion (ACT 610) may include determining that both the imaging device and the object being imaged are in motion at the same time. In another embodiment, determining relative motion (ACT 610) includes determining whether there is movement between at least a portion of the object between frames of the plurality of frames. This motion may be due, for example, to physical movement of the object, or to magnification of an object that is not moving.

In some embodiments, determining relative motion (ACT 610) includes detecting physical motion via, for example, a motion sensor. In one embodiment, detecting motion between an imaging device and an object (ACT 610) includes evaluating frames of an image of the object. For example, an image may include a series of frames. An edge of the image may appear in a first location of a first frame and in a second location of a second frame. The first and second locations may be in different areas of each of the two frames. For example an edge may be detected in a first pixel row of a first frame, and a second pixel row of a second frame. Such movement of edges between frames may indicate relative motion between an imaging device and an object being imaged. Thus, detecting motion between an imaging device and an object (ACT 610) may include detecting a change in edge location of a series of frames of an image.

In various embodiments, determining relative motion (ACT 610) includes detecting and evaluating luminance values of frames of an image. For example, detecting motion (ACT 610) may include detecting luminance values of first and second frames. Differences in luminance values between frames or sets of frames that differ by more than a threshold value may indicate relative motion. In one embodiment, detecting motion between an imaging device and an object (ACT 610) includes detecting luminance values of quadrants or other symmetrical or asymmetrical sections of frames. Changes in these luminance values between frames may be averaged and compared with a threshold value. Motion between the imaging device and the object may be detected (ACT 610) based at least in part on the comparison of threshold values with these determined luminance values, their averages or differences.

In some embodiments, determining relative motion (ACT 610) includes determining motion when the sensor and the object are not in relative physical motion. For example, different levels of magnification can be applied to different frames of an image. This magnification may cause at least a portion of the object to appear in different respective locations on two or more frames of the image. In one embodiment, determining relative motion (ACT 610) includes detecting object movement within the plurality of frames due, for example, to image magnification.

In various embodiments, method 600 includes an act of determining if an image includes color (ACT 615). For example, determining if an image includes color (ACT 615) may include determining if an image is a color image or a black and white image. In one embodiment, determining if an image has color (ACT 615) includes comparing RGB pixel delta values. For example, an image may be determined to have color (ACT 615) when the RGB pixel delta values (or an average thereof) exceed a threshold amount. In another example, determining if an image includes color (ACT 615) may include identifying an image as a black and white image when RGB pixel delta values (or an average thereof) are less than a threshold amount, as uniformity of RGB pixel values may indicate that a lack of color is present in an image.

In various embodiments, method 600 includes an act of adjusting sensor gain (ACT 620) of a sensor in an imaging device. Adjusting sensor gain (ACT 620) may include increasing or decreasing a gain value of an image sensor such as a CMOS sensor. This may change luminance values of a resulting image produced by the sensor. In one embodiment, adjusting sensor gain (ACT 620) includes adjusting sensor gain to drive an image luminance value toward a target luminance value, or to maintain a luminance value at or near a target luminance value. In one embodiment, adjusting sensor gain (ACT 620) includes adjusting sensor gain to maintain frame luminance value at a target luminance value regardless of the outcome of the act of determining whether there is motion (ACT 610)

The image luminance value may include, for example, a luminance value of a frame of an image, an average luminance value of more than one frame of the image, a delta luminance value between all or part of at least one frame of an image, a luminance value of a portion of at least one frame of an image, or luminance values of one or more pixels of one or more frames of an image.

In one embodiment, adjusting sensor gain (ACT 620) includes adjusting sensor gain to maintain an image luminance at or near a target value responsive to determining that there is movement of the object between frames of the image (ACT 610). In another embodiment, adjusting sensor gain (ACT 620) includes adjusting sensor gain to maintain an image luminance at or near a target value responsive to determining that there is no movement of the object between frames of the image (ACT 610).

In one embodiment, method 600 includes an act of maintaining sensor gain (ACT 625). Maintaining sensor gain (ACT 625) may include fixing a sensor gain at a current value in order maintain a luminance value at, or to drive an image luminance value toward, a target value. In another embodiment, this may be responsive to determining that there is or is not relative motion between an imaging device and an object (ACT 610).

In one embodiment, method 600 includes an act of adjusting sensor exposure time (ACT 630). For example, adjusting sensor exposure time (ACT 630) may include adjusting sensor exposure time to maintain a luminance value responsive to determining that there is relative movement (ACT 610). In one embodiment, adjusting sensor exposure time (ACT 630) includes adjusting sensor exposure time to maintain a luminance value responsive to determining that there is no object movement between adjacent frames (ACT 610).

In some embodiments, method 600 includes an act of maintaining sensor exposure time (ACT 635). Maintaining sensor exposure time (ACT 635) may include fixing a sensor exposure time at a current value in order to drive frame luminance toward a target value, or to maintain frame luminance at a present value. This may be responsive to determining either that there is or is not object movement (ACT 610).

In one embodiment, method 600 includes an act of adjusting image contrast (ACT 640). For example, adjusting image contrast (ACT 640) may include adjusting sensor parameters to generate an image having a desired contrast. Adjusting image contrast (ACT 640) may also include post image generation processing to adjust contrast values of an image or its associated frames or pixels. In one embodiment, adjusting image contrast (ACT 640) can occur responsive to determining an image is one of a color image and a black and white image (ACT 615). In another embodiment, adjusting image contrast (ACT 640) can drive an image luminance value toward a target luminance value, maintain a luminance value, or otherwise reduce visually perceptible artifacts from a displayed image.

In various embodiments, method 600 includes an act of adjusting image saturation (ACT 645). Analogous to adjusting image contrast (ACT 640), adjusting image saturation (ACT 645) may include adjusting sensor parameters to generate an image having a desired saturation. Adjusting image saturation (ACT 645) may also include post image generation processing to adjust contrast values of an image or its associated frames or pixels. In one embodiment, adjusting image saturation (ACT 645) can occur responsive to determining an image is one of a color image and a black and white image (ACT 615). In another embodiment, adjusting image saturation (ACT 645) can drive an image luminance value toward a target luminance value, maintain a luminance value at or near a target value, or otherwise reduce visually perceptible artifacts from a displayed image.

In one embodiment, method 600 includes an act of producing a magnified image (ACT 650). In another embodiment producing a magnified image (ACT 650) includes enlarging at least a portion of an image. For example, producing a magnified image (ACT 650) may include enlarging an image to between two and sixteen times the size of the image as generated in generating act (ACT 605). In another example, producing a magnified image (ACT 650) may include enlarging an image to between three and fifteen times the size of the image as generated in generating act (ACT 605). It should be appreciated that other magnification ranges are possible. In one embodiment, a magnified image may be produced (ACT 650) responsive to a user incrementally adjusting a magnification range on a continuous scale of an imaging device. In another embodiment, producing a magnified image (ACT 650) occurs responsive to instructions received from a controller. In one embodiment, producing a magnified image (ACT 650) causes object movement between frames of the image.

It should be appreciated that sensor parameters may be adjusted (ACT 620, ACT 625) or maintained (ACT 630, ACT 635) at the direction of a controller that controls or is part of a sensor. It should also be appreciated that image parameters may be adjusted (ACT 640, ACT 645) at the direction of the same or a different controller.

In one embodiment, producing a magnified image (ACT 650) includes producing a magnified image with a luminance value that can remain substantially similar to a target luminance value by, for example, at least one of the acts of adjusting sensor gain (ACT 620), maintaining sensor gain (ACT 625), adjusting sensor exposure time (ACT 630), and maintaining sensor exposure time (ACT 635) of a sensor that performs an act of generating an image (ACT 605). Producing a magnified image (ACT 650) may also include producing a magnified image with adjusted image contrast (ACT 640), or adjusted image saturation (ACT 645). Producing a magnified image (ACT 650) may include producing a magnified image in real time or near real time. For example, producing a magnified image (ACT 650) may include producing an image as an imaging device is imaging an object. In some embodiments, a magnified image that is produced (ACT 650) may be stored in memory. In another embodiment, image data may be stored and producing a magnified image (ACT 650) may include producing a magnified image from image data stored in a memory.

In one embodiment, method 600 includes an act of providing at least a portion of a magnified image to a display (ACT 655). At least a portion of a magnified image that is produced (ACT 650) may be provided (ACT 655) to, for example, an LCD display. Providing an image to a display (ACT 655) may also include providing an image from an imaging device to a television, screen, or monitor that is not part of the imaging device. This may occur, for example through a wired or wireless connection. Providing an image, magnified image, or portion thereof to a display (ACT 655) may include providing an image to a display in real time for viewing by a user.

It should be appreciated that method 600 may include more or fewer acts than those illustrated in the example of FIG. 6. The order in which acts of this example method may occur can vary. These acts may occur independently and in any order, and need not depend on the performance of any other act of method 600.

Figure 7:
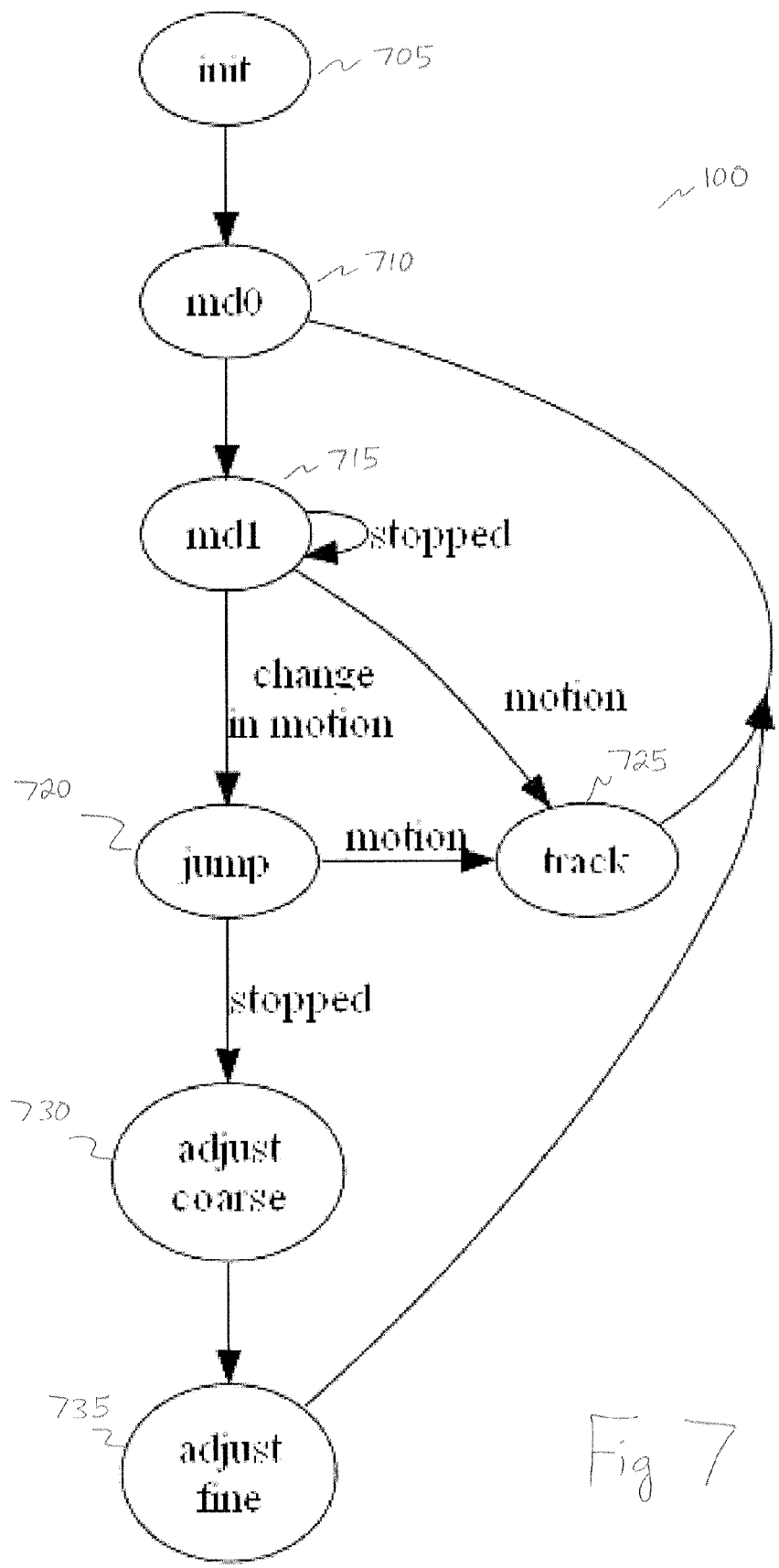
FIG. 7 a block diagram depicting examples of modes of operation of an imaging device in accordance with an embodiment of the present invention.

Operation of imaging device 100 may be described in terms of a finite state machine. For example, the states of imaging device 100 are illustrated in FIG. 7, which is a block diagram depicting examples of modes of operation of imaging device 100 in accordance with aspects of the invention. In one embodiment, imaging device 100 includes initialization state 705, motion detection reference state 710, motion detection subsequent state 715, jump state 720, track state 725, coarse adjust state 730, and fine adjust state 735. In initialization state 705, variables such as sensor frames per second, gain range, exposure time range, and target luminance value may be calibrated or determined. In one embodiment, initialization state 705 occurs after start-up or reset of imaging device 100.

In some embodiments, in motion detection reference state 710, movement of at least a portion of the object between two frames of the image may be detected. Motion detection reference state 710 may include setting sensor exposure time to a first value responsive to detection of object motion due to, for example, image magnification. In one embodiment, sensor gain may be adjusted in motion detection reference state 710 to maintain a desired luminance value of the plurality of frames.

In one embodiment, motion detection subsequent state 715 detects a state change from reference state 710. For example, motion detected in reference state 710 may cease, resulting in a period of no object motion in the frames. Motion detection subsequent state 715 may include setting sensor exposure time to a second value responsive to detection of no motion following the reference state 710 period of detection of motion. In one embodiment, jump state 720 represents a state change between reference state 710 and subsequent state 715. For example, jump state 720 may detect a transition from motion to no motion, or from no motion to motion. In one embodiment, jump state 720 includes a transition in real time of sensor exposure time from a first value to a second value. In other words, sensor exposure time may jump from a first value to a non-continuous second value when imaging device 100 operates in jump state 720.

Depending on the type of transition, imaging device 100 may enter one or more various states. For example, when there is motion, imaging device 100 may enter track state 725. In one embodiment, track state 725 is responsive to a detection of object movement within frames of an image. When this movement is detected, sensor exposure time may be set to a first value, with adjustments to sensor gain to maintain a luminance value of one or more frames at a target value.

In one embodiment, when there is no motion, imaging device 100 may enter adjust coarse state 730. Left unchecked, the jump of sensor exposure time from the first value to the second value may cause a jump in frame luminance, as the different exposure time allows more or less light through to sensor 210. Adjust coarse state 730 can maintain frame luminance values at or near a target luminance value by adjusting sensor gain to account for the change in sensor exposure time values. For example, sensor gain may be increased to account for a second sensor exposure time that is less than the first sensor exposure time. This may maintain frame luminance at an existing (i.e., first sensor exposure time value) level by counteracting the effect that the lower sensor exposure time has on frame luminance.

In one embodiment, imaging device 100 may transition from adjust coarse state to adjust fine state 735. For example, the range of frame luminance values attainable by adjust course state 730 may be restricted due to, for example, the second sensor exposure time value, which, for example, may be fixed when imaging device 100 operates in adjust course state 730. In this example, adjust fine state 735 may adjust the second exposure time value with a sensor gain that may be either fixed or variable. In one embodiment, adjust fine state 735 may produce frame luminance values equal or substantially equal to a target luminance value. At this steady state, sensor gain and exposure time may become fixed. In one embodiment, where adjust fine state 735 produces frames with luminance values that are similar, but not equal, to the target luminance value, the target luminance value may be adjusted to match the luminance values of the frames produced at adjust fine state 735. In one embodiment, imaging device 100 enters track state 725 when there is movement of at least a portion of object between frames, and imaging device enters adjust coarse state 730 and adjust fine state 735 when there is no such movement.

When viewing a static object, the same image is exposed, captured, and displayed over and over but with slight variations from noise, principally photon noise and A/D conversion noise. These noise variations are noticeable in the image to a user and are undesirable. In order to address the problem, another embodiment of the invention displays the same digital frame over and over when there is no relative motion between the imaging device 100 and the object 505. When motion occurs, the system of this embodiment transitions from viewing mode (with a frozen image) to reading mode with the fast exposure. An accelerometer may be used to detect the relative motion of the imaging device and the object, so as to allow a rapid transition between modes.

It should be appreciated that when imaging an object one generally seeks an optimal combination of exposure time and gain. For example, for objects and imaging devices that are stationary, a longer exposure time will typically result in a more crisply defined image with minimal noise, even when magnified greatly in size. To avoid over-exposing the image when using a longer exposure time (i.e., an image that is overly bright and loses contrast), one typically reduces the gain of the sensor. However, when the frames of an image indicate object motion, a long exposure time can result in a blurring of the captured image. To reduce such blurring, one will typically reduce the exposure time. Because of the reduction in exposure time, the amount of light impacting the sensor will be decreased, such that without an adjustment in the gain of the sensor, the image could be overly dark and again lose contrast.

Note that in FIGS. 1 through 7, the enumerated items are shown as individual elements. In actual implementations of the systems and methods described herein, however, they may be inseparable components of other electronic devices such as a digital computer. Thus, actions described above may be implemented at least in part in software that may be embodied in an article of manufacture that includes a program storage medium. The program storage medium includes data signals embodied in one or more of a carrier wave, a computer disk (magnetic, or optical (e.g., CD or DVD, or both), non-volatile memory, tape, a system memory, and a computer hard drive.

From the foregoing, it will be appreciated that the systems and methods described herein afford a simple and effective way to image objects. Imaging devices according to various embodiments are able to produce or generate images of objects having one or more frames. Noise or blurring artifacts due to relative motion between imaging devices and objects during imaging generation can be reduced by adjusting sensor parameters to create an image having a desirable luminance. This increases viewability of displayed magnified images, and allows users to, for example, bring a portable device to an object in order to better view that object.

Any references to front and back, left and right, top and bottom, and upper and lower, above and below, over and under, are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

Any embodiment disclosed herein may be combined with any other embodiment, and references to "an embodiment", "some embodiments", "an alternate embodiment", "various embodiments", "one embodiment" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the objects, aims, and needs disclosed herein.

References to "or" may be construed as inclusive so that any terms described using "or" may indicate any of a single, more than one, and all of the described terms.

Where technical features in the drawings, detailed description or any claim are followed by references signs, the reference signs have been included for the sole purpose of increasing the intelligibility of the drawings, detailed description, and claims. Accordingly, neither the reference signs nor their absence have any limiting effect on the scope of any claim elements.

One skilled in the art will realize the systems and methods described herein may be embodied in other specific forms without departing from the spirit or essential characteristics thereof. For example, sensor gain and exposure time may be increased or decreased independently, concurrently, or subsequently. This may improve image display by driving an image luminance value in a desired direction. Further, other sensor parameters, such as sensor pixel size, frame rate, or pixel luminance or chrominance output formats may be adjusted or maintained to remove artifacts form an image. Examples of such artifacts include mouse teeth, jaggies, and block artifacts, as well as noise and blurring image distortions. The foregoing embodiments are therefore to be considered in all respects illustrative rather than limiting of the described systems and methods. Scope of the systems and methods described herein is thus indicated by the appended claims, rather than the foregoing description, and all changes that come within the meaning and range of equivalency of the claims are therefore intended to be embraced therein.

What is claimed is:

1. An imaging device, comprising:

a sensor configured to provide an image of an object, the sensor having a sensor exposure time and a sensor gain and the image including a plurality of frames, each of the plurality of frames depicting at least a portion of the object;

a motion detector to determine whether there is movement of the at least a portion of the object between adjacent frames of the plurality of frames;

a controller configured to set the sensor exposure time to a first value in response to a determination by the motion detector that there is movement of the at least a portion of the object between adjacent frames, and to set the sensor exposure time to a second value that is substantially different than the first value in response to a determination that there is no movement of the at least a portion of the object between adjacent frames;

the controller further being configured to adjust at least one of the sensor exposure time and the sensor gain to substantially maintain a luminance value of the plurality of frames at a target luminance value irrespective of whether the motion detector determines that there is movement of the at least a portion of the object between adjacent frames or not;

wherein the target luminance value is one of a first target color luminance value and a first target black and white luminance value, the device further comprising:
a color detector to determine whether the image is a color image or a black and white image;
wherein the controller is configured to adjust at least one of the sensor exposure time and the sensor gain to substantially maintain the luminance value of the plurality of frames at different first and second target luminance values dependent upon whether the image is determined to be the color image or the black and white image, the first and second target luminance values being greater for the color image than the black and white image.

2. The imaging device of claim 1, wherein the controller is further configured to adjust at least one of a contrast of the image and a saturation of the image to different values dependent upon whether the motion detector determines that there is movement of the at least a portion of the object between adjacent frames and dependent upon whether the image is a color image or a black and white image.

3. The imaging device of claim 1, wherein the color detector is implemented by the controller.

4. The imaging device of claim 1, wherein the motion detector is configured to determine that there is movement of the at least a portion of the object between adjacent frames in response to relative motion between the object and the sensor and in response to a change in magnification of the at least a portion of the object between adjacent frames.

5. The imaging device of claim 1, wherein the controller is configured to produce a magnified image between two and sixteen times greater than the image, the device further comprising: a display unit configured to display the magnified image.

6. The imaging device of claim 5, wherein the level of magnification of the image is continuous.

7. The imaging device of claim 1, wherein:
the motion detector is configured to determine a luminance value difference that is a difference between a luminance of adjacent frames; and
the motion detector is configured to determine that there is movement of the at least a portion of the object between adjacent frames when the luminance value difference is greater than a threshold value.

8. The imaging device of claim 1, wherein the motion detector is configured to:
identify a plurality of quadrants of adjacent frames;
determine a luminance value of corresponding quadrants of adjacent frames; and
determine that there is movement of the at least a portion of the object between adjacent frames when a difference between the luminance value of the corresponding quadrants of adjacent frames exceeds a threshold value.

9. The imaging device of claim 1, wherein: the motion detector is configured to determine that there is movement of the at least a portion of the object between adjacent frames based at least in part on a location of edges in adjacent frames.

10. The device of claim 1, wherein the motion detector is implemented by the controller.

11. The imaging device of claim 1, wherein the imaging device is configured to produce the same digital frame as the image during periods of time in which it is determined that there is no movement of the at least a portion of the object.

12. The imaging device of claim 1, wherein, during a period of time in which it is determined that there is movement of the at least a portion of the object between adjacent frames, the controller is configured to maintain the sensor exposure time at the first value and to adjust the sensor gain to substantially maintain the luminance value of the plurality of frames at the target luminance value.

13. The imaging device of claim 1, wherein, during a first portion of a period of time in which it is determined that there is no movement of the at least a portion of the object between adjacent frames, the controller is configured to maintain the sensor exposure time at the second value and to adjust the sensor gain to substantially maintain the luminance value of the plurality of frames at the target luminance value.

14. The imaging device of claim 13, wherein, during a second portion of the period of time in which it is determined that there is no movement of the at least a portion of the object between adjacent frames, the controller is further configured to maintain the sensor gain at a fixed gain value and to further adjust the sensor exposure time to a fixed exposure time value so that the luminance value of the plurality of frames is equal to the target luminance value.

15. The imaging device of claim 14, wherein, during a third portion of the period of time in which it is determined that there is no movement of the at least a portion of the object between adjacent frames, the controller is configured to maintain the sensor gain at the fixed gain value, and to maintain the sensor exposure time at the fixed exposure time value.

16. The imaging device of claim 15, wherein the third portion of the period of time is subsequent to the second portion of the period of time, and wherein the second portion of the period of time is subsequent to the first portion of the period of time.

17. A method of imaging objects, comprising acts of:
generating an image of an object using a sensor, the image including a plurality of frames depicting at least a portion of the object;
determining whether there is movement between of the at least a portion of the object between adjacent frames of the plurality of frames;
setting, responsive to the act of determining, a sensor exposure time of the sensor to a first value when movement of the at least a portion of the object between adjacent frames is determined and setting the sensor exposure time of the sensor to a second value that is substantially different than the first value when no movement of the at least a portion of the object between adjacent frames is determined; and
adjusting at least one of the sensor exposure time and a sensor gain of the sensor to substantially maintain a luminance value of the plurality of frames at a target luminance value irrespective of whether movement of the at least a portion of the object between adjacent frames is determined or not;
determining whether the image is a color image or a black and white image; and
adjusting at least one of the sensor exposure time and the sensor gain to substantially maintain the luminance value of the plurality of frames at different first and second target luminance values dependent upon whether the image is determined to be the color image or the black and white image, the first and second target luminance values being greater for the color image than the black and white image.

18. The method of claim 17, comprising: adjusting, responsive to a determination that the image is the color image, at least one of a contrast of the image and a saturation of the image.

19. The method of claim 17, comprising:
producing a magnified image of the image of the object, the magnified image between two and sixteen times greater than the image;
and providing at least a portion of the magnified image to a display unit.

20. The method of claim 17, comprising:
determining a delta luminance value difference that is a difference between a luminance of adjacent frames;
and determining that there is movement of the at least a portion of the object between adjacent frames when the luminance value difference is greater than a threshold value.

21. The method of claim 17, further comprising:
identifying a plurality of quadrants of adjacent frames;
determining a luminance value of corresponding quadrants of adjacent frames;
and determining that there is movement of the at least a portion of the object between adjacent frames when a difference between the luminance value of the corresponding quadrants of adjacent frames exceeds a threshold value.

22. The method of claim 17, wherein: determining that there is movement of the at least a portion of the object between adjacent frames based at least in part on a location of edges in adjacent frames.

* * * * *

UNITED STATES PATENT AND TRADEMARK OFFICE
CERTIFICATE OF CORRECTION

| | | |
|---|---|---|
| PATENT NO. | : 8,416,319 B2 | Page 1 of 1 |
| APPLICATION NO. | : 12/563814 | |
| DATED | : April 9, 2013 | |
| INVENTOR(S) | : Todd Conard | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 292 days.

Signed and Sealed this
Twenty-fifth Day of November, 2014

Michelle K. Lee
*Deputy Director of the United States Patent and Trademark Office*